Dec. 5, 1939.   C. A. CHAYNE   2,182,249
SPRING SUSPENSION
Filed Jan. 6, 1938   2 Sheets-Sheet 1
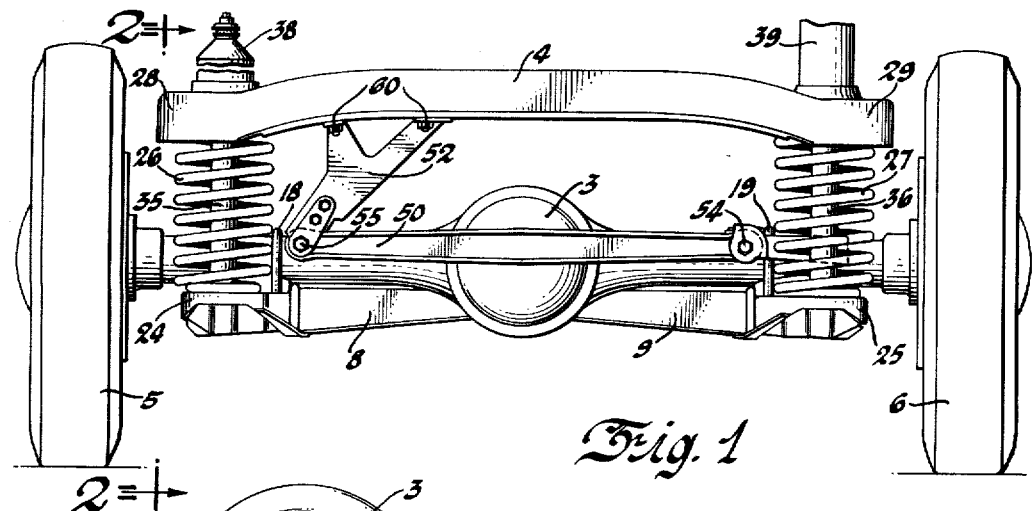
Fig. 1
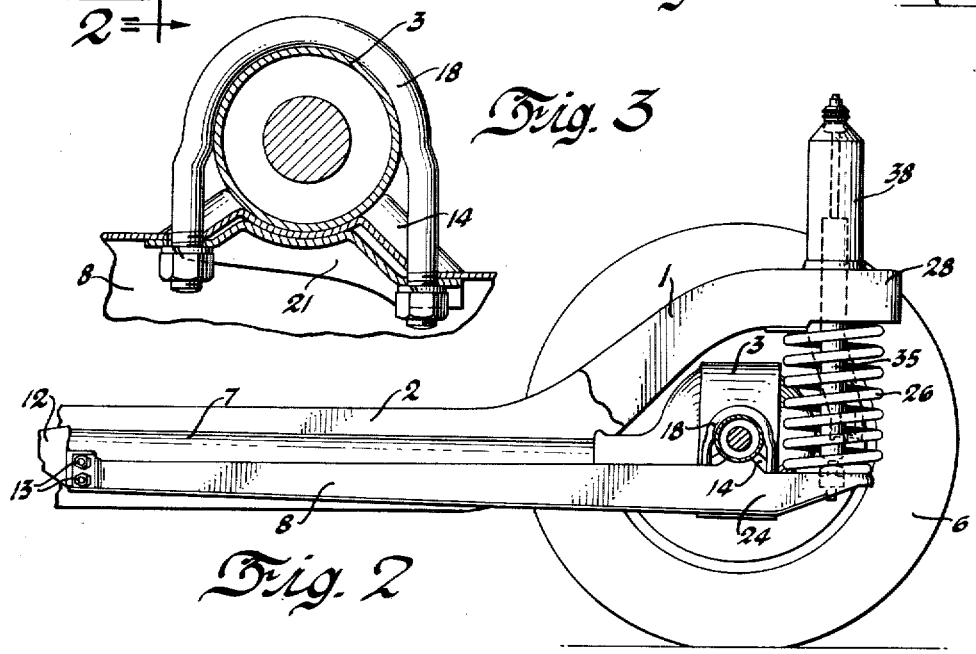
Fig. 3
Fig. 2
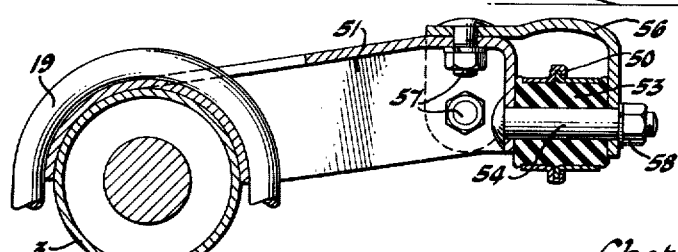
Fig. 4
Inventor
Charles A. Chayne
By Blackmore, Spencer & Flint
Attorneys Dec. 5, 1939.   C. A. CHAYNE   2,182,249
SPRING SUSPENSION
Filed Jan. 6, 1938   2 Sheets-Sheet 2

Inventor
Charles A. Chayne
By Blackmore, Spencer & Hulse
Attorneys

Patented Dec. 5, 1939

2,182,249

UNITED STATES PATENT OFFICE 2,182,249

SPRING SUSPENSION

Charles A. Chayne, Flint, Mich., assignor to General Motors Corporation, Detroit, Mich., a corporation of Delaware Application January 6, 1938, Serial No. 183,643

5 Claims. (Cl. 267—20)

This invention relates to a vehicle having a conventional axle carrying road wheels on opposite sides of the vehicle, in which the spring means has the single function of resiliently resisting upward motion of the axle relatively to the vehicle frame, there being means separate from the spring for controlling movement of the axle longitudinally and transversely of the vehicle.

It especially concerns a motor vehicle in which upward movement of the rear axle relatively to the frame is directly resisted by coil springs.

One object of the invention is a construction in which a torque tube drive rear axle is provided with strut arms of considerable size and strength sufficient to relieve the torque tube and the rear axle housing of a considerable part of their duty, and to provide perches for coil springs resiliently resisting upward movement of the axle relatively to the frame.

Another object of the invention is the combination, with the coil springs, of direct acting shock absorbers conveniently disposed axially of and within the convolutions of the coil springs.

The above and other objects of the invention will be apparent as the description proceeds.

According to the invention, the strut arms, extending, from the torque tube at a point close to its ball joint connection with the vehicle frame towards opposite ends of the axle, are of sufficiently large a section to take a considerable portion of the driving and braking torque and all the spring load. This enables the use of a thinner walled torque tube and a lighter weight rear axle housing.

The strut arms are extended to the rear of the rear axle to provide perches for coil springs immediately to the rear of the rear axle, and substantially vertically disposed between the strut arms and the vehicle frame, which terminates in a transverse member providing seatings for the other ends of the springs.

The direct acting shock absorbers each have one end anchored to the perches on the strut arms, and extend upward axially of the springs and through the spring seats on the frame; the other ends of the shock absorbers each being anchored to the top ends of tubular casings, extending vertically above the spring seats on the frame.

In the drawings

Fig. 1 is a rear elevation of the rear end of a chassis according to the invention.

Fig. 2 is a side elevation on line 2—2 of Fig. 1.
Fig. 3 is an enlarged view on line 3—3 of Fig. 5.
Fig. 4 is an enlarged view on line 4—4 of Fig. 5.

Figure 5:
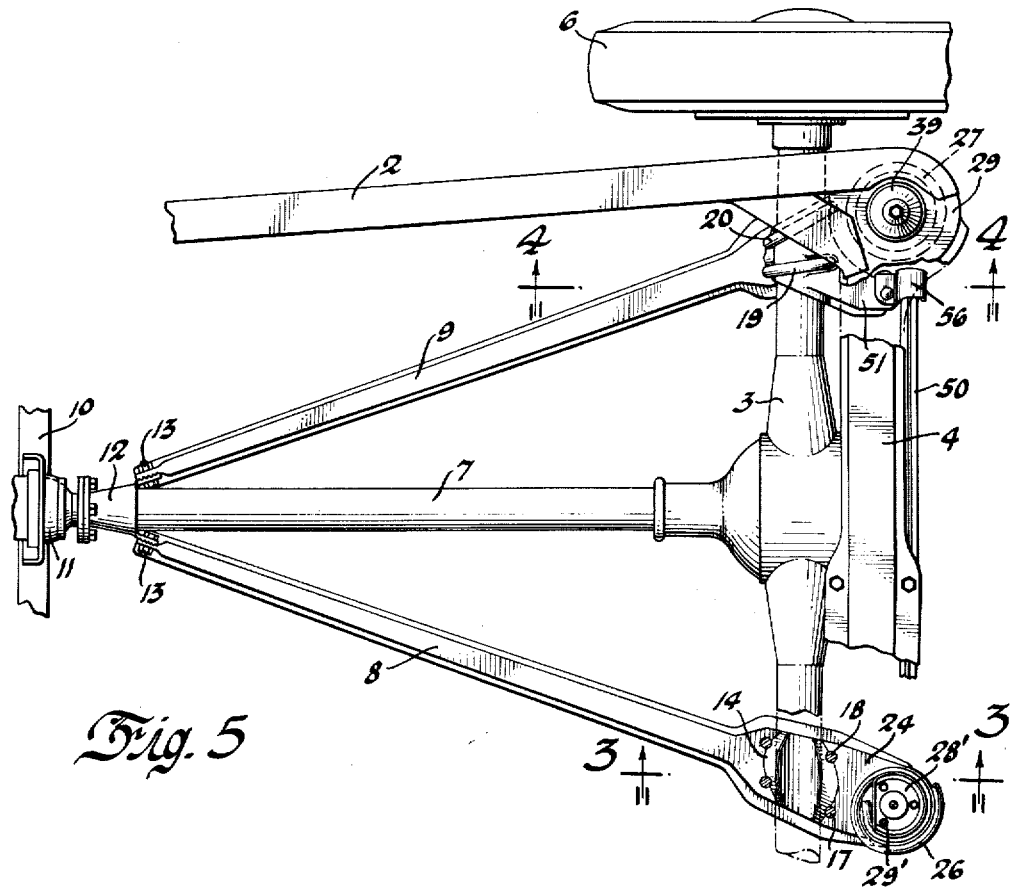
Fig. 5 is a plan view of the rear end of the chassis with parts broken away.

The vehicle frame has side members 1 and 2 which are upswept above the rear axle housing 3, and terminate immediately above the rear axle housing where there is a transverse member 4.

The rear axle housing 3 supports driven rear wheels 5 and 6. Its movement longitudinally of the frame is controlled by the torque tube 7 provided with strut arms 8 and 9, and which is pivotally connected to a transverse member 10 of the vehicle frame through a ball joint 11, in the usual and well known manner.

The strut arms 8 and 9 are flanged channel section steel stampings and are fastened to a saddle 12 at the forward end of the torque tube 7 by the bolts such as 13; there being inter-engaging coined serrations in the jointing surfaces of both the strut arms and the saddle to prevent relative movement between these parts. The strut arms extend below and beyond the axle at points toward the opposite ends thereof where they are each shaped to provide a seating such as 14 for the axle, as shown most clearly in Fig. 3.

The strut arms are attached to the axle with the axle firmly held in the seatings such as 14 on the strut arms 8 and 9 by U clips 17, 18, and 19, 20, respectively; there being stamped backing plates such as 21 on the underside of the seatings such as 14.

The extensions of the strut arms 8 and 9 beyond the axle constitute perches 24 and 25 for the lower ends of coil springs 26 and 27 resiliently resisting upward movement of the axle 3 relatively to the frame.

The upper ends of the springs 26 and 27 have seatings in pockets 28 and 29 formed in the terminal transverse member 4 at the juncture therewith of the frame side members 1 and 2. The lower ends of the springs 26 and 27 are clamped to the perches 24 and 25 by clamping plates such as 28' and bolts 29' as shown in Fig. 5.

Direct acting shock absorbers 35 and 36 have their lower ends connected to the spring perches 24 and 25, and extend upwardly, internally of the spring convolutions, through clearance holes in the pockets 28 and 29, to the point of connection of their upper ends to the tops of tubular casings 38 and 39, which have their lower ends suitably attached, as by welding, to the frame cross member 4, to form extensions of the pockets 28 and 29. The connection of the shock absorbers to the spring perches 24 and 25 and the tubular casings 38 and 39 is effected through the medium of rubber cushions (of well known type) and providing for the requisite degree of universal movement at these points.

Movement of the axle 3 transversely of the frame is controlled by a transverse radius rod 50, consisting of two longitudinally united steel stampings. The transverse radius rod 50 has one end pivotally connected to a bracket 51 on the axle housing 3 towards the right hand side of the vehicle, and its other end pivotally connected to a bracket 52 on the frame cross member 4 towards the left hand side of the vehicle.

The radius rod has identical eyes at each end, provided with rubber bushings such as 53 (Fig. 4) of well known type, which frictionally grip the eyes of the radius rod, and the pivot pins 54 and 55 on the brackets 51 and 52 respectively, to which they are connected.

As shown most clearly in Fig. 4, the bracket 51 is fastened to the axle housing 3 beneath the U bolts 19 and 20 and extends rearwardly therefrom to carry the pivot pin 54 which has one end riveted to the bracket 51. The other end of the pivot pin is screw threaded and passes through a hole in a supplementary bracket piece 56 which is bolted to the bracket 51 by bolts such as 57. When the nut 58 on the pivot pin is tightened the rubber bushing 53 is compressed and frictionally grips both the pin 54 and the eye of the radius rod.

The bracket 52 is secured to the frame cross member 4 by bolts such as 60 and extends downwardly therefrom to carry the pivot pin 55 for the other end of the radius rod; the pivot pin 55 being secured to the bracket 52 in a manner similar to the manner in which the pivot pin 54 is secured to the bracket 51.

The pivot pins 54 and 55 are substantially horizontal and parallel to each other longitudinally of the vehicle, and the radius rod 50 is substantially horizontal in the normal position of the parts.

Pivotal movement of the radius rod about the axes of the pivot pins 54 and 55 and also a degree of universal movement is permitted by the flexibility of the rubber bushings 54, in known manner.

Figures 6, 7:
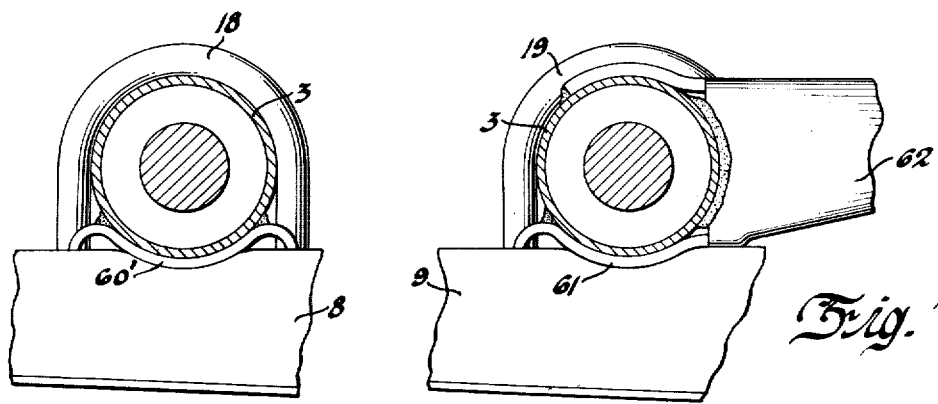
Figs. 6 and 7 are enlarged views of detail modifications.

Figs. 6 and 7 show an alternative way of seating the axle 3 on the strut arms 8 and 9 respectively. In these figures the strut arms 8 and 9 have simple depressions providing seatings for sole plates 60' and 61 which are welded to the axle 3. The sole plate 61 is similar to the sole plate 60' except that it forms part of a bracket 62 which is otherwise similar to the bracket 51 of Fig. 4.

It will be appreciated that all the spring load and a considerable part of the driving thrust, the driving torque reaction and braking torque, is taken through the strut arms direct to the ball joint connection of the torque tube to the vehicle frame and that as a consequence the rear axle housing and the torque tube need only be sufficiently strong to take the remainder of these forces and therefore may be lighter than would otherwise be the case.

I claim:

1. In a motor vehicle, in combination, a frame, a light torque tube, a light live axle housing rigidly connected thereto, said torque tube having a ball joint connection with the vehicle frame, flanged channel section steel strut arms extending from a point adjacent to the ball joint on the torque tube to points toward opposite ends of the axle housing, seatings on the strut arms, a pair of U-bolts embracing the axle and rigidly clamping the axle housing to each of the seatings, perches on the strut arms, an unguided coil spring between each of the perches and the vehicle frame, directly resisting upward movement of the strut arms relatively to the frame, and a means controlling movement of the axle housing transversely of the frame; said torque tube and strut arms controlling movement of the axle housing longitudinally of the frame and said strut arms taking all the spring load and a considerable part of the driving thrust, the driving torque reaction and braking torque, direct to the ball joint connection to the vehicle frame, thereby relieving the axle housing and the torque tube of all but the remainder of these forces.

2. The combination according to claim 1, in which the strut arms pass below the axle housing and therebeyond to provide the perches for the coil springs.

3. The combination according to claim 1, in which the means controlling movement of the axle housing transversely of the frame includes a transverse radius rod having one end pivotally connected to the vehicle frame towards one side of the vehicle and its other end pivotally connected to a bracket on the axle beneath the U-bolts at the other side of the vehicle.

4. The combination according to claim 1, in which the frame terminates in a transverse member immediately above the spring perches and the upper ends of the coil springs have seatings in pockets at the ends of the transverse member.

5. The combination according to claim 1, in which the strut arms are sheet steel stampings and the seatings are formed to the radius of the axle housing.

CHARLES A. CHAYNE.

CERTIFICATE OF CORRECTION.

Patent No. 2,182,249.     December 5, 1939.

CHARLES A. CHAYNE.

It is hereby certified that error appears in the printed specification of the above numbered patent requiring correction as follows: Page 2, second column, line 21, claim 1, after the word "axle" insert housing; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.

lar casings 38 and 39 is effected through the medium of rubber cushions (of well known type) and providing for the requisite degree of universal movement at these points.

Movement of the axle 3 transversely of the frame is controlled by a transverse radius rod 50, consisting of two longitudinally united steel stampings. The transverse radius rod 50 has one end pivotally connected to a bracket 51 on the axle housing 3 towards the right hand side of the vehicle, and its other end pivotally connected to a bracket 52 on the frame cross member 4 towards the left hand side of the vehicle.

The radius rod has identical eyes at each end, provided with rubber bushings such as 53 (Fig. 4) of well known type, which frictionally grip the eyes of the radius rod, and the pivot pins 54 and 55 on the brackets 51 and 52 respectively, to which they are connected.

As shown most clearly in Fig. 4, the bracket 51 is fastened to the axle housing 3 beneath the U bolts 19 and 20 and extends rearwardly therefrom to carry the pivot pin 54 which has one end riveted to the bracket 51. The other end of the pivot pin is screw threaded and passes through a hole in a supplementary bracket piece 56 which is bolted to the bracket 51 by bolts such as 57. When the nut 58 on the pivot pin is tightened the rubber bushing 53 is compressed and frictionally grips both the pin 54 and the eye of the radius rod.

The bracket 52 is secured to the frame cross member 4 by bolts such as 60 and extends downwardly therefrom to carry the pivot pin 55 for the other end of the radius rod; the pivot pin 55 being secured to the bracket 52 in a manner similar to the manner in which the pivot pin 54 is secured to the bracket 51.

The pivot pins 54 and 55 are substantially horizontal and parallel to each other longitudinally of the vehicle, and the radius rod 50 is substantially horizontal in the normal position of the parts.

Pivotal movement of the radius rod about the axes of the pivot pins 54 and 55 and also a degree of universal movement is permitted by the flexibility of the rubber bushings 54, in known manner.

Figs. 6 and 7 show an alternative way of seating the axle 3 on the strut arms 8 and 9 respectively. In these figures the strut arms 8 and 9 have simple depressions providing seatings for sole plates 60' and 61 which are welded to the axle 3. The sole plate 61 is similar to the sole plate 60' except that it forms part of a bracket 62 which is otherwise similar to the bracket 51 of Fig. 4.

It will be appreciated that all the spring load and a considerable part of the driving thrust, the driving torque reaction and braking torque, is taken through the strut arms direct to the ball joint connection of the torque tube to the vehicle frame and that as a consequence the rear axle housing and the torque tube need only be sufficiently strong to take the remainder of these forces and therefore may be lighter than would otherwise be the case.

I claim:

1. In a motor vehicle, in combination, a frame, a light torque tube, a light live axle housing rigidly connected thereto, said torque tube having a ball joint connection with the vehicle frame, flanged channel section steel strut arms extending from a point adjacent to the ball joint on the torque tube to points toward opposite ends of the axle housing, seatings on the strut arms, a pair of U-bolts embracing the axle and rigidly clamping the axle housing to each of the seatings, perches on the strut arms, an unguided coil spring between each of the perches and the vehicle frame, directly resisting upward movement of the strut arms relatively to the frame, and a means controlling movement of the axle housing transversely of the frame; said torque tube and strut arms controlling movement of the axle housing longitudinally of the frame and said strut arms taking all the spring load and a considerable part of the driving thrust, the driving torque reaction and braking torque, direct to the ball joint connection to the vehicle frame, thereby relieving the axle housing and the torque tube of all but the remainder of these forces.

2. The combination according to claim 1, in which the strut arms pass below the axle housing and therebeyond to provide the perches for the coil springs.

3. The combination according to claim 1, in which the means controlling movement of the axle housing transversely of the frame includes a transverse radius rod having one end pivotally connected to the vehicle frame towards one side of the vehicle and its other end pivotally connected to a bracket on the axle beneath the U-bolts at the other side of the vehicle.

4. The combination according to claim 1, in which the frame terminates in a transverse member immediately above the spring perches and the upper ends of the coil springs have seatings in pockets at the ends of the transverse member.

5. The combination according to claim 1, in which the strut arms are sheet steel stampings and the seatings are formed to the radius of the axle housing.

CHARLES A. CHAYNE.

CERTIFICATE OF CORRECTION.

Patent No. 2,182,249.  December 5, 1939.

CHARLES A. CHAYNE.

It is hereby certified that error appears in the printed specification of the above numbered patent requiring correction as follows: Page 2, second column, line 21, claim 1, after the word "axle" insert housing; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.